United States Patent
Nicholls et al.

(10) Patent No.: US 9,355,676 B1
(45) Date of Patent: May 31, 2016

(54) DATA STORAGE DEVICE CONTROLLING AMPLITUDE AND PHASE OF DRIVING VOLTAGE TO GENERATE POWER FROM A SPINDLE MOTOR

(71) Applicant: Western Digital Technologies, Inc., Irvine, CA (US)

(72) Inventors: Michael Troy Nicholls, Laguna Hills, CA (US); Joseph J. Crowfoot, Costa Mesa, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/668,949

(22) Filed: Mar. 25, 2015

(51) Int. Cl.
*G11B 19/20* (2006.01)
*H02P 3/14* (2006.01)
*H02P 6/00* (2016.01)
*G11B 19/04* (2006.01)

(52) U.S. Cl.
CPC .......... *G11B 19/2081* (2013.01); *G11B 19/047* (2013.01); *H02P 3/14* (2013.01); *H02P 6/002* (2013.01)

(58) Field of Classification Search
None
See application file for complete search history.

(56) References Cited

U.S. PATENT DOCUMENTS

| | | | |
|---|---|---|---|
| 4,215,301 A | 7/1980 | Mason | |
| 4,755,892 A | 7/1988 | Carteau et al. | |
| 5,182,685 A | 1/1993 | Krause et al. | |
| 5,327,059 A | 7/1994 | Truong et al. | |
| 5,414,861 A | 5/1995 | Horning | |
| 5,438,549 A | 8/1995 | Levy | |
| 5,461,518 A | 10/1995 | Saiki et al. | |
| 5,495,372 A | 2/1996 | Bahlmann et al. | |
| 5,504,402 A | 4/1996 | Menegoli | |
| 5,889,629 A | 3/1999 | Patton, III | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |

(Continued)

FOREIGN PATENT DOCUMENTS

WO   2010151347   12/2010

OTHER PUBLICATIONS

Michael T. Nicholls, U.S. Appl. No. 14/582,068, filed Dec. 23, 2014, 23 pages.

(Continued)

*Primary Examiner* — Wayne Young
*Assistant Examiner* — James L Habermehl

(57) ABSTRACT

A data storage device is disclosed comprising a disk, a spindle motor configured to rotate the disk, wherein the spindle motor comprises a plurality of windings, and a head actuated over the disk. The windings of the spindle motor are commutated based on a commutation sequence while applying a periodic driving voltage to each winding, wherein the periodic driving voltage comprises an operating amplitude during normal operation. When a supply voltage falls below a threshold, the spindle motor is configured into a power generator by at least adjusting the amplitude and a phase of the periodic driving voltage so that a periodic current flowing through each winding is substantially opposite in phase from a sinusoidal back electromotive force (BEMF) voltage generated by each winding.

27 Claims, 6 Drawing Sheets

(56) References Cited

U.S. PATENT DOCUMENTS

| | | | |
|---|---|---|---|
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,305,628 B1 | 10/2001 | Thompson et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |
| 6,484,577 B1 | 11/2002 | Bennett | |
| 6,493,169 B1 | 12/2002 | Ferris et al. | |
| 6,496,324 B1 | 12/2002 | Golowka et al. | |
| 6,498,698 B1 | 12/2002 | Golowka et al. | |
| 6,507,450 B1 | 1/2003 | Elliott | |
| 6,534,936 B2 | 3/2003 | Messenger et al. | |
| 6,538,839 B1 | 3/2003 | Ryan | |
| 6,545,835 B1 | 4/2003 | Codilian et al. | |
| 6,549,359 B1 | 4/2003 | Bennett et al. | |
| 6,549,361 B1 | 4/2003 | Bennett et al. | |
| 6,560,056 B1 | 5/2003 | Ryan | |
| 6,568,268 B1 | 5/2003 | Bennett | |
| 6,574,062 B1 | 6/2003 | Bennett et al. | |
| 6,577,465 B1 | 6/2003 | Bennett et al. | |
| 6,594,102 B1 | 7/2003 | Kanda et al. | |
| 6,614,615 B1 | 9/2003 | Ju et al. | |
| 6,614,618 B1 | 9/2003 | Sheh et al. | |
| 6,636,377 B1 | 10/2003 | Yu et al. | |
| 6,690,536 B1 | 2/2004 | Ryan | |
| 6,693,764 B1 | 2/2004 | Sheh et al. | |
| 6,707,635 B1 | 3/2004 | Codilian et al. | |
| 6,710,953 B1 | 3/2004 | Vallis et al. | |
| 6,710,966 B1 | 3/2004 | Codilian et al. | |
| 6,714,371 B1 | 3/2004 | Codilian | |
| 6,714,372 B1 | 3/2004 | Codilian et al. | |
| 6,724,564 B1 | 4/2004 | Codilian et al. | |
| 6,731,450 B1 | 5/2004 | Codilian et al. | |
| 6,735,041 B1 | 5/2004 | Codilian et al. | |
| 6,738,220 B1 | 5/2004 | Codilian | |
| 6,747,837 B1 | 6/2004 | Bennett | |
| 6,760,186 B1 | 7/2004 | Codilian et al. | |
| 6,788,483 B1 | 9/2004 | Ferris et al. | |
| 6,791,785 B1 | 9/2004 | Messenger et al. | |
| 6,795,268 B1 | 9/2004 | Ryan | |
| 6,819,518 B1 | 11/2004 | Melkote et al. | |
| 6,826,006 B1 | 11/2004 | Melkote et al. | |
| 6,826,007 B1 | 11/2004 | Patton, III | |
| 6,847,502 B1 | 1/2005 | Codilian | |
| 6,850,383 B1 | 2/2005 | Bennett | |
| 6,850,384 B1 | 2/2005 | Bennett | |
| 6,856,556 B1 | 2/2005 | Hajeck | |
| 6,865,049 B1 | 3/2005 | Codilian et al. | |
| 6,867,944 B1 | 3/2005 | Ryan | |
| 6,876,508 B1 | 4/2005 | Patton, III et al. | |
| 6,882,496 B1 | 4/2005 | Codilian et al. | |
| 6,885,514 B1 | 4/2005 | Codilian et al. | |
| 6,900,958 B1 | 5/2005 | Yi et al. | |
| 6,900,959 B1 | 5/2005 | Gardner et al. | |
| 6,903,897 B1 | 6/2005 | Wang et al. | |
| 6,914,740 B1 | 7/2005 | Tu et al. | |
| 6,914,743 B1 | 7/2005 | Narayana et al. | |
| 6,920,004 B1 | 7/2005 | Codilian et al. | |
| 6,924,959 B1 | 8/2005 | Melkote et al. | |
| 6,924,960 B1 | 8/2005 | Melkote et al. | |
| 6,924,961 B1 | 8/2005 | Melkote et al. | |
| 6,934,114 B1 | 8/2005 | Codilian et al. | |
| 6,934,135 B1 | 8/2005 | Ryan | |
| 6,937,420 B1 | 8/2005 | McNab et al. | |
| 6,937,423 B1 | 8/2005 | Ngo et al. | |
| 6,952,322 B1 | 10/2005 | Codilian et al. | |
| 6,954,324 B1 | 10/2005 | Tu et al. | |
| 6,958,881 B1 | 10/2005 | Codilian et al. | |
| 6,963,465 B1 | 11/2005 | Melkote et al. | |
| 6,965,488 B1 | 11/2005 | Bennett | |
| 6,967,458 B1 | 11/2005 | Bennett et al. | |
| 6,967,811 B1 | 11/2005 | Codilian et al. | |
| 6,970,319 B1 | 11/2005 | Bennett et al. | |
| 6,972,539 B1 | 12/2005 | Codilian et al. | |
| 6,972,540 B1 | 12/2005 | Wang et al. | |
| 6,972,922 B1 | 12/2005 | Subrahmanyam et al. | |
| 6,975,480 B1 | 12/2005 | Codilian et al. | |
| 6,977,789 B1 | 12/2005 | Cloke | |
| 6,980,389 B1 | 12/2005 | Kupferman | |
| 6,987,636 B1 | 1/2006 | Chue et al. | |
| 6,987,639 B1 | 1/2006 | Yu | |
| 6,989,954 B1 | 1/2006 | Lee et al. | |
| 6,992,848 B1 | 1/2006 | Agarwal et al. | |
| 6,992,851 B1 | 1/2006 | Cloke | |
| 6,992,852 B1 | 1/2006 | Ying et al. | |
| 6,995,941 B1 | 2/2006 | Miyamura et al. | |
| 6,999,263 B1 | 2/2006 | Melkote et al. | |
| 6,999,267 B1 | 2/2006 | Melkote et al. | |
| 7,006,320 B1 | 2/2006 | Bennett et al. | |
| 7,016,134 B1 | 3/2006 | Agarwal et al. | |
| 7,023,637 B1 | 4/2006 | Kupferman | |
| 7,023,640 B1 | 4/2006 | Codilian et al. | |
| 7,027,256 B1 | 4/2006 | Subrahmanyam et al. | |
| 7,027,257 B1 | 4/2006 | Kupferman | |
| 7,035,026 B2 | 4/2006 | Codilian et al. | |
| 7,038,522 B2 | 5/2006 | Fauh et al. | |
| 7,046,472 B1 | 5/2006 | Melkote et al. | |
| 7,050,249 B1 | 5/2006 | Chue et al. | |
| 7,050,254 B1 | 5/2006 | Yu et al. | |
| 7,050,258 B1 | 5/2006 | Codilian | |
| 7,054,089 B2 * | 5/2006 | Kokami | 360/73.03 |
| 7,054,098 B1 | 5/2006 | Yu et al. | |
| 7,061,714 B1 | 6/2006 | Yu | |
| 7,064,918 B1 | 6/2006 | Codilian et al. | |
| 7,068,451 B1 | 6/2006 | Wang et al. | |
| 7,068,459 B1 | 6/2006 | Cloke et al. | |
| 7,068,461 B1 | 6/2006 | Chue et al. | |
| 7,068,463 B1 | 6/2006 | Ji et al. | |
| 7,078,873 B2 * | 7/2006 | Suzuki et al. | 318/437 |
| 7,088,547 B1 | 8/2006 | Wang et al. | |
| 7,095,579 B1 | 8/2006 | Ryan et al. | |
| 7,110,208 B1 | 9/2006 | Miyamura et al. | |
| 7,110,214 B1 | 9/2006 | Tu et al. | |
| 7,113,362 B1 | 9/2006 | Lee et al. | |
| 7,113,365 B1 | 9/2006 | Ryan et al. | |
| 7,116,505 B1 | 10/2006 | Kupferman | |
| 7,126,781 B1 | 10/2006 | Bennett | |
| 7,126,857 B2 | 10/2006 | Hajeck | |
| 7,142,400 B1 | 11/2006 | Williams et al. | |
| 7,158,329 B1 | 1/2007 | Ryan | |
| 7,158,332 B2 * | 1/2007 | Kokami | 360/75 |
| 7,161,757 B1 | 1/2007 | Krishnamoorthy et al. | |
| 7,180,703 B1 | 2/2007 | Subrahmanyam et al. | |
| 7,184,230 B1 | 2/2007 | Chue et al. | |
| 7,196,864 B1 | 3/2007 | Yi et al. | |
| 7,199,966 B1 | 4/2007 | Tu et al. | |
| 7,203,021 B1 | 4/2007 | Ryan et al. | |
| 7,209,321 B1 | 4/2007 | Bennett | |
| 7,211,973 B1 * | 5/2007 | Hoo et al. | 318/400.34 |
| 7,212,364 B1 | 5/2007 | Lee | |
| 7,212,374 B1 | 5/2007 | Wang et al. | |
| 7,215,504 B1 | 5/2007 | Bennett | |
| 7,224,546 B1 | 5/2007 | Orakcilar et al. | |
| 7,248,426 B1 | 7/2007 | Weerasooriya et al. | |
| 7,251,098 B1 | 7/2007 | Wang et al. | |
| 7,253,582 B1 | 8/2007 | Ding et al. | |
| 7,253,989 B1 | 8/2007 | Lau et al. | |

(56) References Cited

U.S. PATENT DOCUMENTS

| | | |
|---|---|---|
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,327,106 B1 * | 2/2008 | Hoo et al. ............ 318/400.34 |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,409,590 B2 | 8/2008 | Moshayedi et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,560,883 B1 | 7/2009 | Hoo et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,623,316 B1 | 11/2009 | Rana et al. |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,733,712 B1 | 6/2010 | Walston et al. |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,808,200 B2 | 10/2010 | Liu et al. |
| 7,816,876 B2 * | 10/2010 | Tomigashi ............ 318/400.02 |
| 7,839,102 B1 | 11/2010 | Rana et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,974,038 B2 | 7/2011 | Krishnan et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,471,509 B2 | 6/2013 | Bonvin |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 * | 12/2013 | Yang et al. ............ 360/73.03 |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |

(56) References Cited

U.S. PATENT DOCUMENTS

| | | |
|---|---|---|
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,422 B1 | 5/2014 | Agness et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 8,873,193 B2 | 10/2014 | Galbiati |
| 8,982,501 B1 | 3/2015 | Nicholls et al. |
| 9,093,105 B2 | 7/2015 | Ferris et al. |
| 2001/0024339 A1 | 9/2001 | Yaegashi |
| 2002/0079852 A1 | 6/2002 | Menegoli |
| 2002/0141102 A1 | 10/2002 | Kusumoto |
| 2004/0080858 A1 | 4/2004 | Suzuki |
| 2006/0069870 A1 | 3/2006 | Nicholson et al. |
| 2007/0033433 A1 | 2/2007 | Pecone et al. |
| 2008/0111423 A1 | 5/2008 | Baker et al. |
| 2009/0140575 A1 | 6/2009 | McGee et al. |
| 2009/0206657 A1 | 8/2009 | Vuk et al. |
| 2009/0289607 A1 | 11/2009 | Mentelos |
| 2010/0002331 A1 | 1/2010 | Tan |
| 2010/0035085 A1 | 2/2010 | Jung et al. |
| 2010/0052625 A1 | 3/2010 | Cagno et al. |
| 2010/0302664 A1 | 12/2010 | Heo et al. |
| 2011/0198931 A1 | 8/2011 | Ly |
| 2012/0284493 A1 | 11/2012 | Lou et al. |
| 2013/0120870 A1 | 5/2013 | Zhou et al. |
| 2013/0148240 A1 | 6/2013 | Ferris et al. |

OTHER PUBLICATIONS

Timothy A. Ferris, et al., U.S. Appl. No. 13/316,128, filed Dec. 9, 2011, 15 pages.

\* cited by examiner

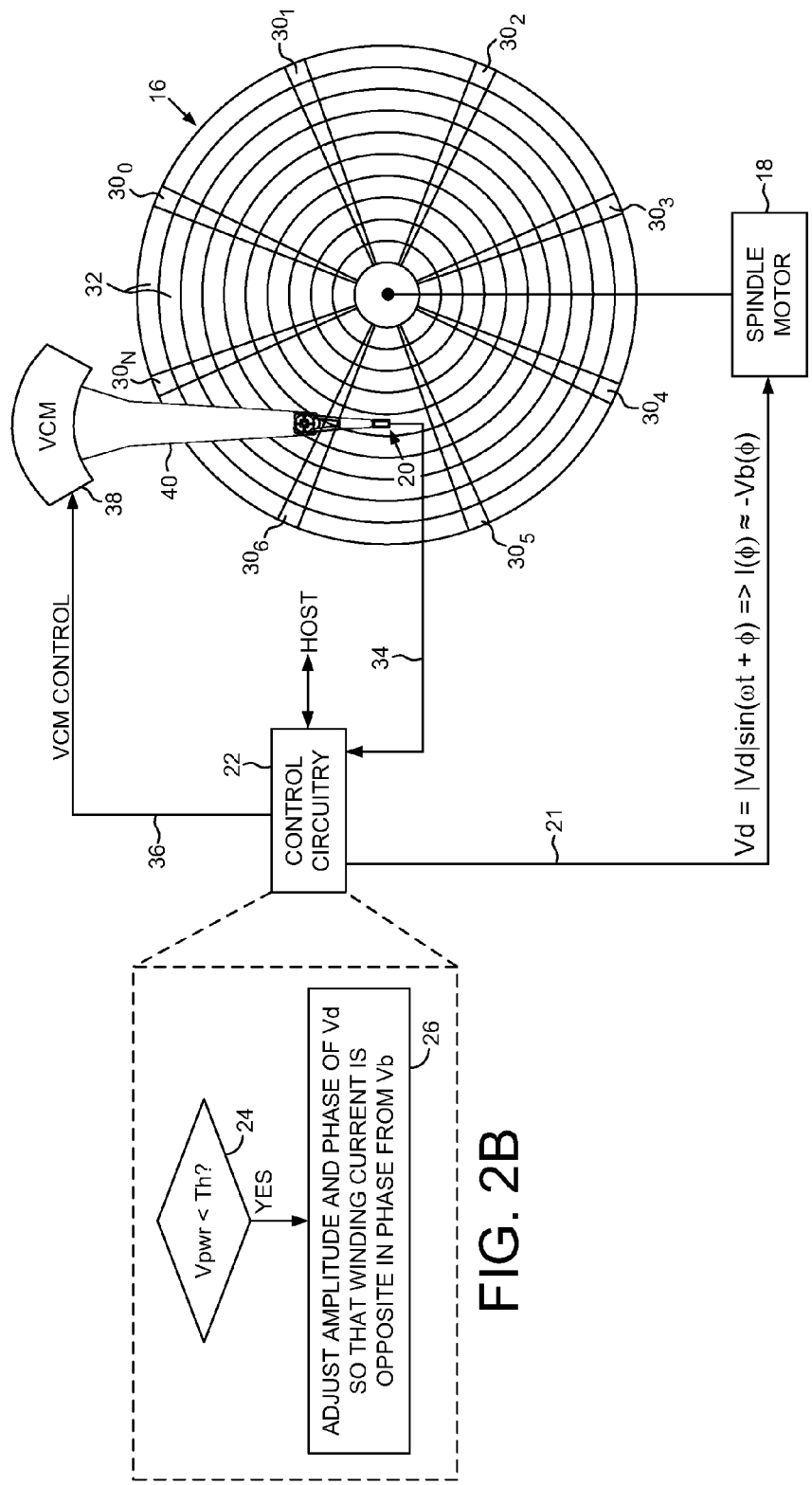

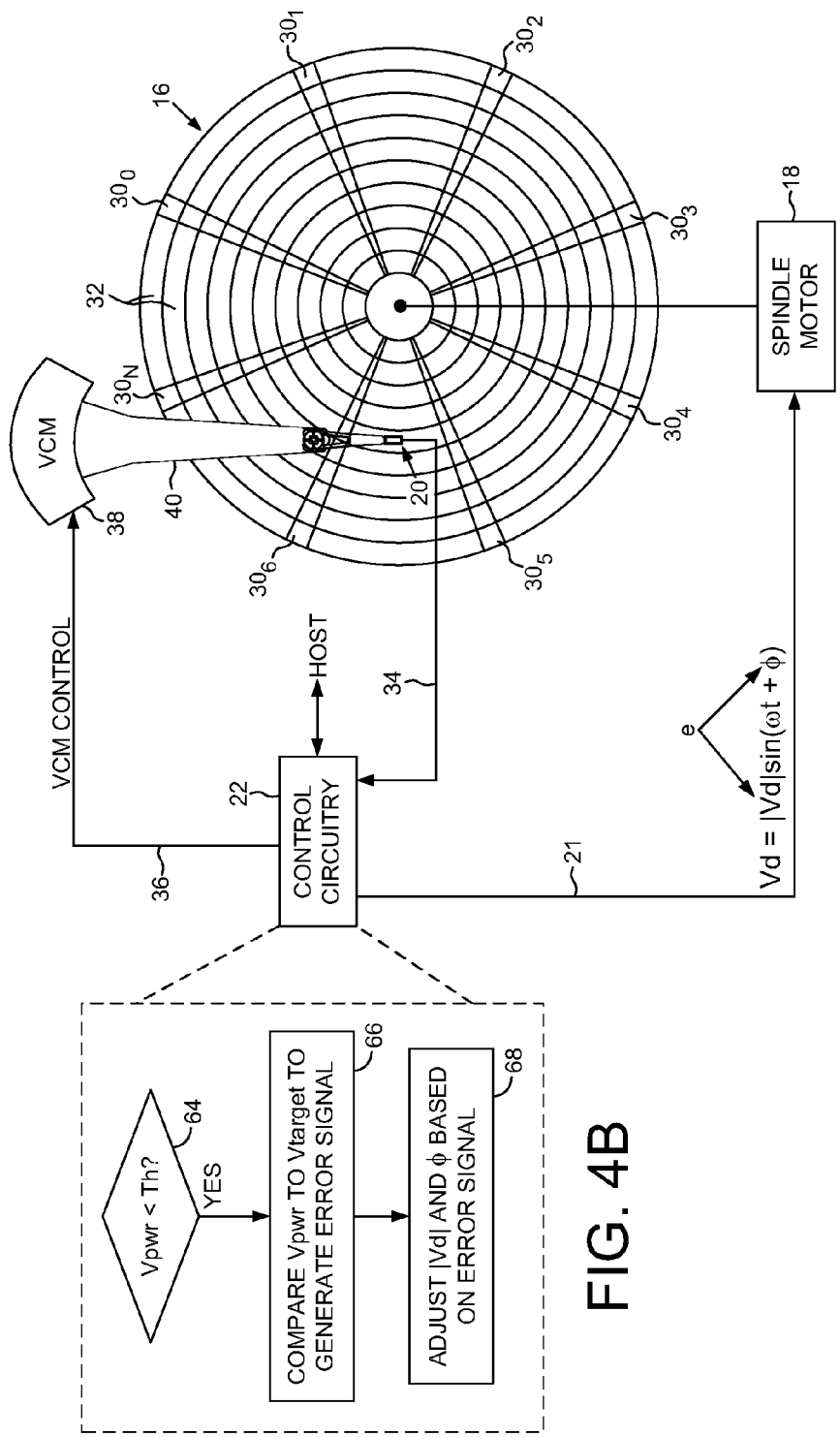

DATA STORAGE DEVICE CONTROLLING AMPLITUDE AND PHASE OF DRIVING VOLTAGE TO GENERATE POWER FROM A SPINDLE MOTOR

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

The disk 2 is typically rotated by a spindle motor at a high speed so that an air bearing forms between the head and the disk surface. A commutation controller applies a driving signal to the windings of the spindle motor using a particular commutation sequence in order to generate a rotating magnetic field that causes the spindle motor to rotate. Prior art disk drives have typically controlled the commutation of the windings by measuring a zero-crossing frequency of a back electromotive force (BEMF) voltage generated by the windings of the spindle motor. Prior art disk drives may also utilize the BEMF voltage generated by the spindle motor as a power source during power failure to assist with power down operations, such as unloading the head onto a ramp.

BRIEF DESCRIPTION OF THE DRAWINGS

FIG. 2A shows a data storage device in the form of a disk drive according to an embodiment comprising a head actuated over a disk rotated by a spindle motor.

FIG. 2B is a flow diagram according to an embodiment wherein when a supply voltage falls below a threshold the spindle motor is configured into a power generator by adjusting a phase and amplitude of the periodic driving voltage so that a periodic current flowing through each winding is substantially opposite in phase from a sinusoidal back electromotive force (BEMF) voltage generated by each winding.

FIGS. 4A and 4B show an embodiment wherein when a supply voltage falls below a threshold the spindle motor is configured into a power generator by comparing the supply voltage to a target voltage to generate an error signal, and adjusting a phase and the amplitude of the periodic driving voltage based on the error signal.

DETAILED DESCRIPTION

Figure 1:
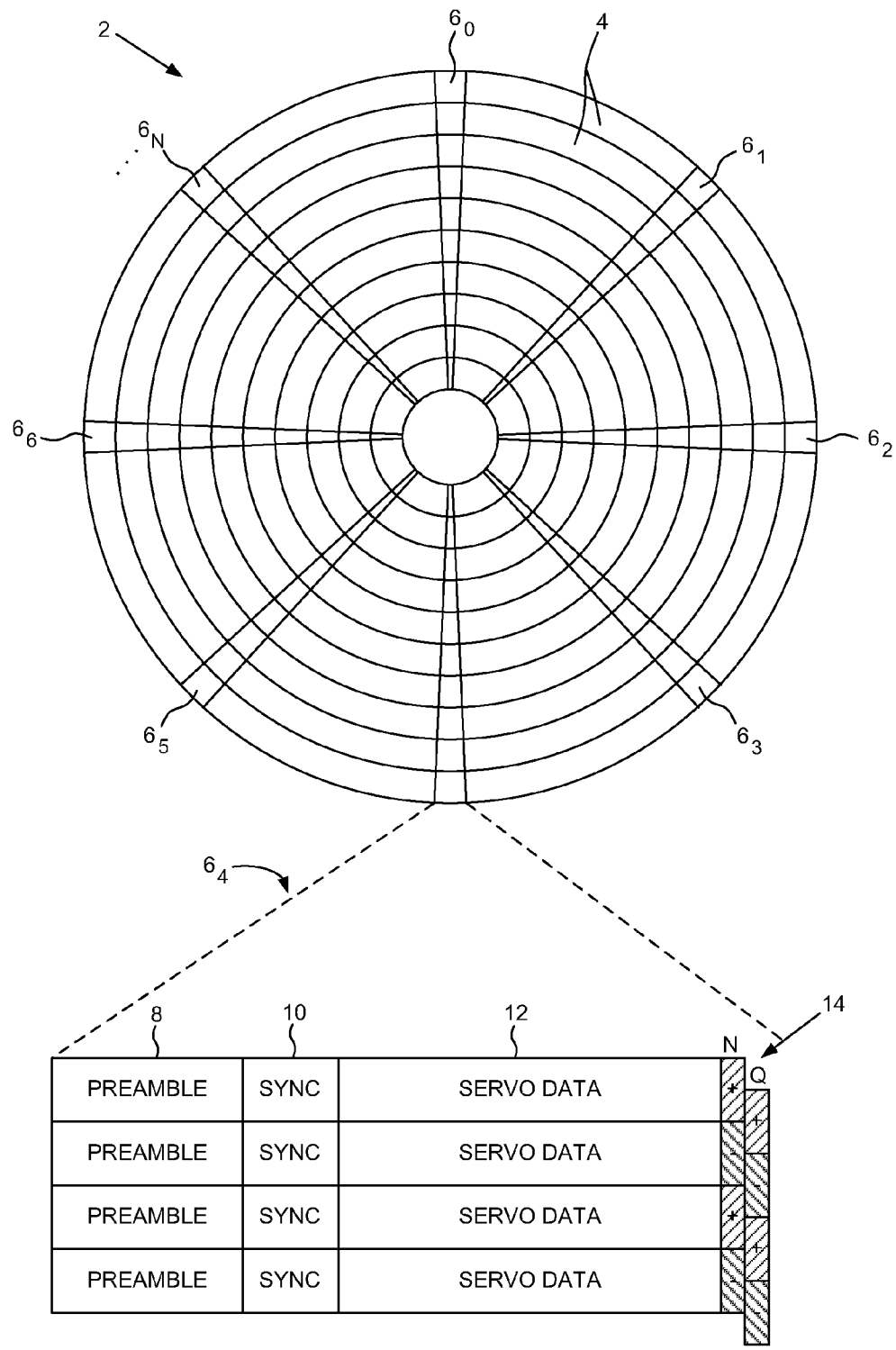
FIG. 1 shows a prior art disk format comprising a plurality of servo tracks defined by servo sectors.

FIG. 2A shows a data storage device in the form of a disk drive according to an embodiment comprising a disk 16, a spindle motor 18 configured to rotate the disk 16, wherein the spindle motor 18 comprises a plurality of windings, and a head 20 actuated over the disk 16. The windings of the spindle motor 18 are commutated based on a commutation sequence while applying a periodic driving voltage to each winding, wherein the periodic driving voltage comprises an operating amplitude during normal operation. The disk drive further comprises control circuitry 22 configured to execute the flow diagram of FIG. 2B, wherein when a supply voltage falls below a threshold (block 24), the spindle motor is configured into a power generator by at least adjusting the amplitude and a phase of the periodic driving voltage so that a periodic current flowing through each winding is substantially opposite in phase from a sinusoidal back electromotive force (BEMF) voltage generated by each winding (block 26).

In the embodiment of FIG. 2A, the disk 16 comprises a plurality of servo sectors $30_0$-$30_N$ that define a plurality of servo tracks 32, wherein data tracks are defined relative to the servo tracks at the same or different radial density. The control circuitry 22 processes a read signal 34 emanating from the head 20 to demodulate the servo sectors $30_0$-$30_N$ and generate a position error signal (PES) representing an error between the actual position of the head and a target position relative to a target track. A servo control system in the control circuitry 22 filters the PES using a suitable compensation filter to generate a control signal 36 applied to a voice coil motor (VCM) 38 which rotates an actuator arm 40 about a pivot in order to actuate the head 20 radially over the disk 16 in a direction that reduces the PES. The servo sectors $30_0$-$30_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

Figures 3A, 3B:
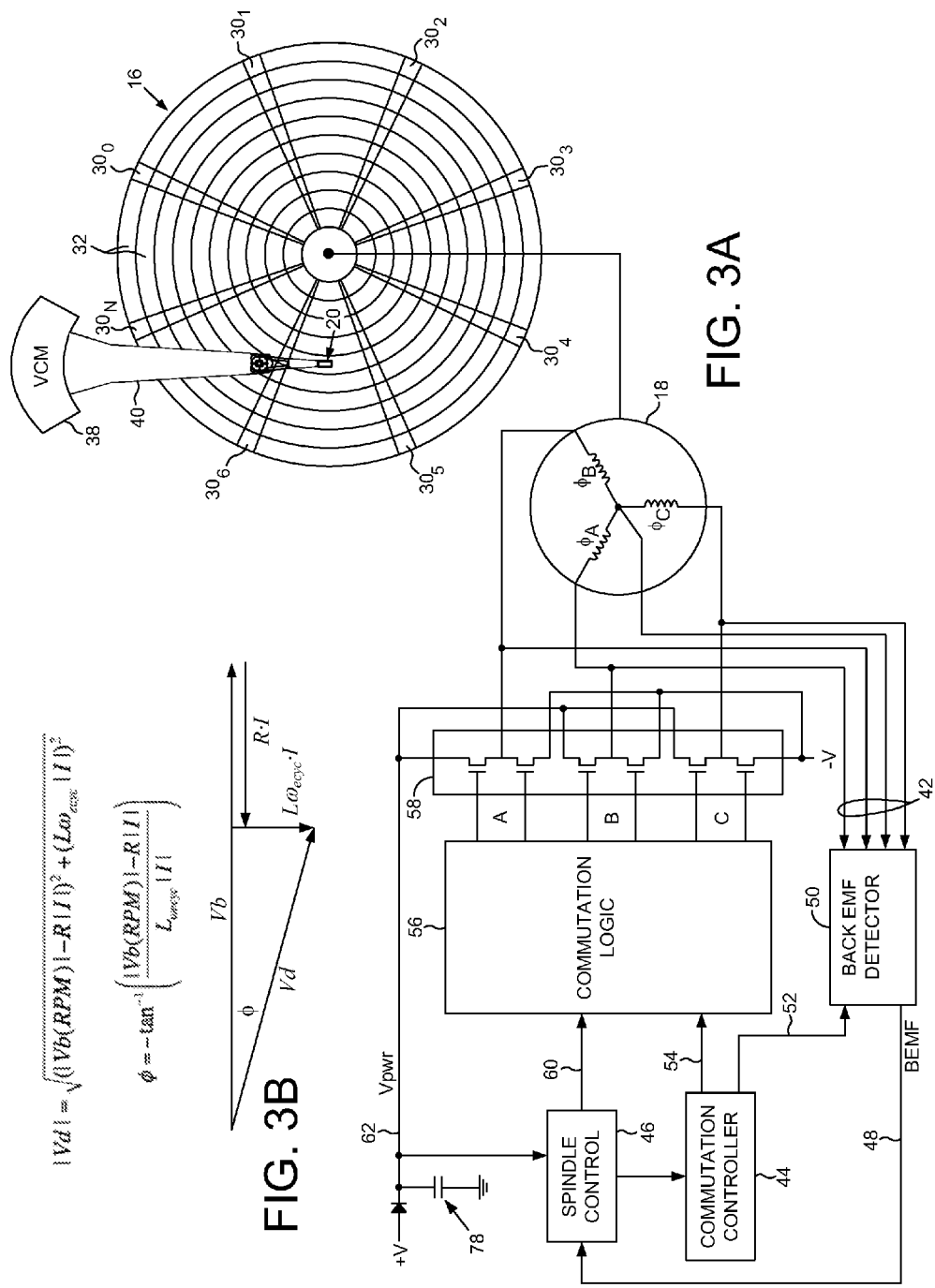
FIG. 3A shows control circuitry according to an embodiment comprising a plurality of switches for driving the windings of the spindle motor based on a commutation sequence.
FIG. 3B illustrates an embodiment wherein the spindle motor is configured into a power generator by adjusting a phase and amplitude of the periodic driving voltage so that a periodic current flowing through each winding is substantially opposite in phase from a sinusoidal back electromotive force (BEMF) voltage generated by each winding.

FIG. 3A shows control circuitry 22 according to an embodiment wherein a back electromotive force (BEMF)

voltage 42 generated by the windings of the spindle motor 18 may be processed in order to drive the commutation sequence of a commutation controller 44. A spindle control block 46 may process a BEMF signal 48 which may be a square wave representing the BEMF zero-crossings as detected by a BEMF detector 50. The commutation controller 44 may generate a control signal 52 which configures the BEMF detector 50 to detect the zero-crossing of the BEMF voltage generated by each winding as the disk rotates. The commutation controller 44 also generates a control signal 54 applied to commutation logic 56. In the embodiment of FIG. 3, the commutation logic 56 is configured by the control signal 54 to control the state of switches 58 in order to drive the windings with driving voltages +V and −V. The commutation logic 44 may operate in any suitable manner, such as by driving the switches 58 as linear amplifiers that apply continuous-time sinusoidal voltages to the windings. In another embodiment, the commutation logic 56 may drive the switches 58 using pulse width modulation (PWM), such as using square wave PWM, trapezoidal PWM, or sinusoidal PWM. Regardless as to how the windings are driven, the commutation controller 44 generates the control signal 54 so that the windings are commutated at the correct periods, thereby generating the desired rotating magnetic field that causes the spindle motor to rotate. In one embodiment, the spindle control block 46 may generate a control signal 60 that controls the effective amplitude of the periodic driving voltage applied to the windings (continuous or PWM), thereby controlling the speed of the spindle motor 18.

If a power failure occurs while the disk 16 is spinning, there is residual kinetic energy as the disk 16 continues to rotate the spindle motor 18, and therefore the spindle motor 18 can be converted into a power generator used to power the control circuitry 22 while executing power down operations, such as completing a current write operation to the disk 16 before unloading the head 20 onto a ramp. In one embodiment, the spindle motor 18 may generate power by sourcing current to the supply voltage Vpwr 62 when the supply voltage Vpwr 62 falls below a threshold (e.g., due to a power failure or other power transient event).

In the embodiment of FIG. 2A, the periodic driving voltage Vd for driving the windings of the spindle motor is generated while rotating the disk during normal operation based on:

$$Vd = |Vd|\sin(\omega_{ecyc}t + \phi_{phase} + \phi_T)$$

where |Vd| represents the amplitude of the periodic driving voltage, $\omega_{ecyc}$ represents the rotation frequency (in electrical cycles), $\phi_{phase}$ represents a phase offset that corresponds to the phase of the winding, and $\phi_T$ represents a phase offset that applies an accelerating force to the spindle motor. In one embodiment, the power generated by the spindle motor 18 (e.g., during a power failure) may be maximized when the current flowing through the windings is substantially opposite in phase from the sinusoidal BEMF voltage generated by each winding. Accordingly in an embodiment illustrated in FIG. 3B, when the supply voltage Vpwr 62 falls below a threshold, the control circuitry may configure an amplitude |Vd| and phase $\phi$ of the periodic driving voltage Vd applied to each winding based on:

$$|Vd| = \sqrt{(|Vb(RPM)| - R|I|)^2 + (L\omega_{ecyc}|I|)^2}$$

$$\phi = \tan^{-1}\left(\frac{|Vb(RPM)| - R|I|}{L_{\omega ecyc}|I|}\right)$$

where RPM represents a measured rotation speed of the spindle motor, |Vb(RPM)| represents an amplitude of the sinusoidal BEMF voltage as a function of the measured rotation speed, R represents a resistance of the winding, L represents an inductance of the winding, $\omega_{ecyc}$ represents a frequency of the sinusoidal BEMF voltage, and |I| represents an amplitude of the periodic current flowing through the winding. As shown in FIG. 3B, when the amplitude and phase of the periodic driving voltage are controlled based on the above equations, the phase of the current flowing through each winding is substantially opposite the phase of the sinusoidal BEMF voltage generated by each winding, thereby maximizing the power generated by the spindle motor.

Figure 5:
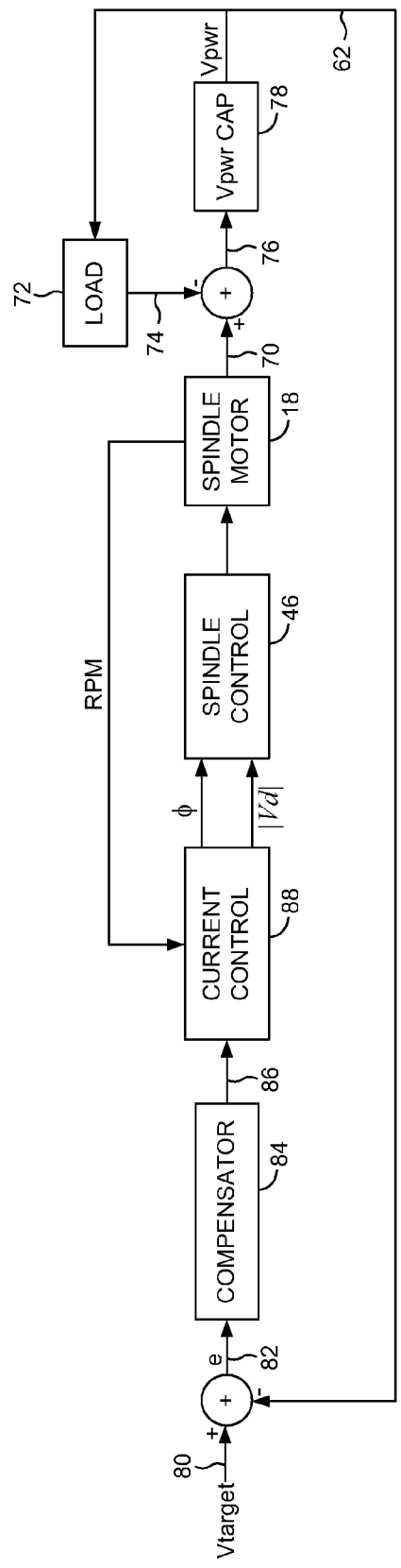
FIG. 5 shows an embodiment wherein when a supply voltage falls below a threshold the spindle motor is configured into a power generator by comparing the supply voltage to a target voltage to generate an error signal, and adjusting a phase and amplitude of the periodic driving voltage based on the error signal.

FIGS. 4A and 4B show an embodiment wherein when the supply voltage falls below a threshold (block 64), the spindle motor is configured into a power generator by at least comparing the supply voltage to a target voltage to generate an error signal (block 66) and adjusting the amplitude and a phase of the periodic driving voltage based on the error signal (block 68). FIG. 5 shows control circuitry according to this embodiment wherein current 70 is sourced by the spindle motor 18, for example, during a power failure. Part of this current 70 is consumed by the load 72 of the disk drive (to power the load 72) and therefore the load current 74 is shown as being subtracted from the current 70 sourced by the spindle motor 18, leaving a residual current 76 that charges the supply voltage capacitor 78. The amplitude of the supply voltage Vpwr 62 depends on the amount of current 74 consumed by the load 72.

In one embodiment, the amount of power generated by the spindle motor 18 is regulated so as to maintain the supply voltage Vpwr 62 at a target voltage Vtarget 80. Referring again to FIG. 5, the supply voltage Vpwr 62 is subtracted from a target voltage Vtarget 80 to generate an error signal 82. A suitable compensator 84 (e.g., proportional-integral-derivative (PID) compensator) filters the error signal 82 to generate a filtered error signal 86. A current control block 88 processes the filtered error signal 86 to adjust the amplitude |Vd| and phase $\phi$ of the periodic driving voltage Vd. For example, in one embodiment the power generated by the spindle motor 18 increases as the amplitude |Vd| of the driving voltage decreases (up to a limit). In addition in the embodiment described above, the power generated by the spindle motor 18 may be maximized by adjusting the amplitude |Vd| and phase $\phi$ of the periodic driving voltage Vd so that a periodic current flowing through each winding is substantially opposite in phase from a sinusoidal back electromotive force (BEMF) voltage generated by each winding. Accordingly in one embodiment, when the filtered error signal 86 is negative, indicating that the supply voltage Vpwr 62 is less than the target voltage Vtarget 80, the current control block 88 may decrease the amplitude |Vd| of the periodic driving voltage Vd and increase the phase $\phi$ of the periodic driving voltage Vd so as to increase the power generated by the spindle motor 18, thereby increasing the supply voltage Vpwr 62 until it matches the target voltage Vtarget 80.

In one embodiment, the degree to which the amplitude and/or phase of the periodic driving voltage is adjusted may be limited, for example, relative to a peak power that may be generated by the spindle motor 18 and/or relative to a desired level of power efficiency attained during power failure operations. In one embodiment, the load 72 of the disk drive may be reduced (e.g., by reducing the power consumed by the VCM 38 during an unload operation) if the limits of the amplitude and/or phase of the periodic driving voltage are reached.

Figure 6A:
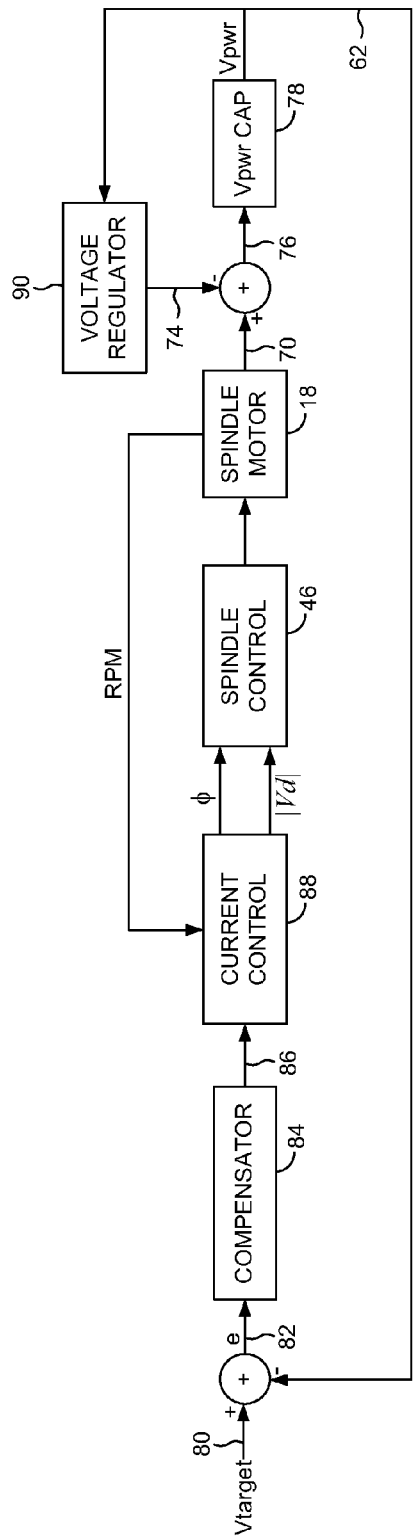
FIGS. 6A and 6B show an embodiment wherein the target voltage substantially maximizes an efficiency of a voltage regulator powered by the supply voltage.
Figure 6B:
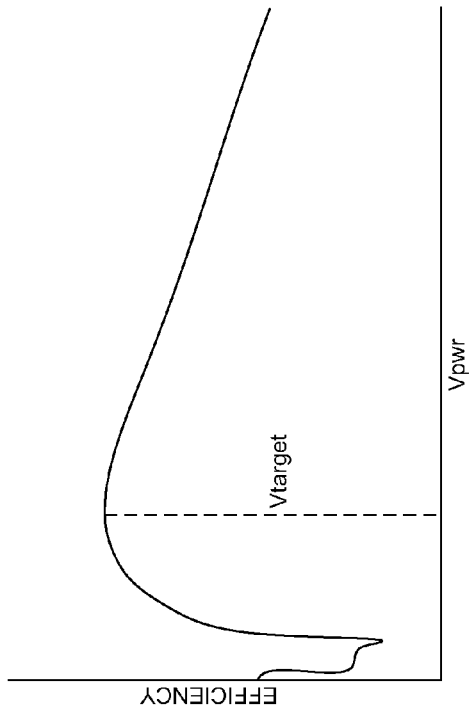

In the embodiment of FIG. 5, any suitable target voltage 80 may be selected to regulate the power generated by the spindle motor 18. FIGS. 6A and 6B show an embodiment wherein the load 72 of the disk drive comprises a voltage regulator 90. FIG. 6B illustrates an embodiment wherein an efficiency of the voltage regulator 90 may be maximized at a target supply voltage Vpwr 62. Accordingly, in one embodiment the target voltage Vtarget 80 for regulating the power generated by the spindle motor 18 may be selected so as to substantially maximizes an efficiency of the voltage regulator 90 powered by the supply voltage Vpwr 62.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk;
   a spindle motor configured to rotate the disk, wherein the spindle motor comprises a plurality of windings;
   a head actuated over the disk; and
   control circuitry powered by a supply voltage, the control circuitry configured to:
   commutate the windings of the spindle motor based on a commutation sequence while applying a periodic driving voltage to each winding, wherein the periodic driving voltage comprises an operating amplitude during normal operation; and
   when the supply voltage falls below a threshold, configure the spindle motor into a power generator by at least adjusting the amplitude and a phase of the periodic driving voltage so that a periodic current flowing through each winding is substantially opposite in phase from a sinusoidal back electromotive force (BEMF) voltage generated by each winding,
   wherein adjusting the amplitude and the phase of the periodic driving voltage comprises adjusting at least one of the amplitude and the phase based on an amplitude of the sinusoidal BEMF voltage, a resistance of the windings, and an inductance of the windings.

2. The data storage device as recited in claim 1, wherein the control circuitry is further configured to:
   measure a rotation speed of the spindle motor; and
   adjust the amplitude of the periodic driving voltage based on the measured rotation speed.

3. The data storage device as recited in claim 2, wherein the control circuitry is further configured to adjust the amplitude of the periodic driving voltage based on:

$$\sqrt{(|Vb(RPM)|-R|I|)^2+(L\omega_{ecyc}|I|)^2}$$

where:
   RPM represents the measured rotation speed;
   |Vb(RPM)| represents an amplitude of the sinusoidal BEMF voltage as a function of the measured rotation speed;
   R represents the resistance;
   L represents the inductance;
   $\omega_{ecyc}$ represents a frequency of the sinusoidal BEMF voltage; and
   |I| represents an amplitude of the periodic current.

4. The data storage device as recited in claim 1, wherein the control circuitry is further configured to:
   measure a rotation speed of the spindle motor; and
   adjust the phase of the periodic driving voltage based on the measured rotation speed.

5. The data storage device as recited in claim 4, wherein the control circuitry is further configured to adjust the phase of the periodic driving voltage based on:

$$\tan^{-1}\left(\frac{|Vb(RPM)| - R|I|}{L_{\omega ecyc}|I|}\right)$$

where:
RPM represents the measured rotation speed;
|Vb(RPM)| represents an amplitude of the sinusoidal BEMF voltage as a function of the measured rotation speed;
R represents the resistance;
L represents the inductance;
$\omega_{ecyc}$ represents a frequency of the sinusoidal BEMF voltage; and
|I| represents an amplitude of the periodic current.

6. The data storage device as recited in claim 1, wherein the control circuitry is further configured to:
compare the supply voltage to a target voltage to generate an error signal; and
adjust the phase of the periodic driving voltage and the amplitude of the periodic driving voltage based on the error signal.

7. The data storage device as recited in claim 6, wherein adjusting the phase of the periodic driving voltage and the amplitude of the periodic driving voltage based on the error signal adjusts an amplitude of the current flowing through each winding.

8. The data storage device as recited in claim 6, wherein:
the control circuitry comprises a voltage regulator; and
the target voltage substantially maximizes an efficiency of the voltage regulator powered by the supply voltage.

9. A data storage device comprising:
a disk;
a spindle motor configured to rotate the disk, wherein the spindle motor comprises a plurality of windings;
a head actuated over the disk; and
control circuitry powered by a supply voltage, the control circuitry configured to:
commutate the windings of the spindle motor based on a commutation sequence while applying a periodic driving voltage to each winding, wherein the periodic driving voltage comprises an operating amplitude during normal operation; and
when the supply voltage falls below a threshold, configure the spindle motor into a power generator by at least:
comparing the supply voltage to a target voltage to generate an error signal; and
adjusting the amplitude and a phase of the periodic driving voltage based on the error signal.

10. The data storage device as recited in claim 9, wherein the control circuitry is further configured to adjust the amplitude and phase of the periodic driving voltage so that a periodic current flowing through each winding is substantially opposite in phase from a sinusoidal back electromotive force (BEMF) voltage generated by each winding.

11. A method of operating a data storage device, the method comprising:
rotating a disk using a spindle motor comprising a plurality of windings;
actuating a head over the disk;
commutating the windings of the spindle motor based on a commutation sequence while applying a periodic driving voltage to each winding, wherein the periodic driving voltage comprises an operating amplitude during normal operation; and
when a supply voltage for powering the data storage device falls below a threshold, configuring the spindle motor into a power generator by at least adjusting the amplitude and a phase of the periodic driving voltage so that a periodic current flowing through each winding is substantially opposite in phase from a sinusoidal back electromotive force (BEMF) voltage generated by each winding,
wherein adjusting the amplitude and the phase of the periodic driving voltage comprises adjusting at least one of the amplitude and the phase based on an amplitude of the sinusoidal BEMF voltage, a resistance of the windings, and an inductance of the windings.

12. The method as recited in claim 11, further comprising:
measuring a rotation speed of the spindle motor; and
adjusting the amplitude of the periodic driving voltage based on the measured rotation speed.

13. The method as recited in claim 12, further comprising adjusting the amplitude of the periodic driving voltage based on:

$$\sqrt{(|Vb(RPM)|-R|I|)^2+(L\omega_{ecyc}|I|)^2}$$

where:
RPM represents the measured rotation speed;
|Vb(RPM)| represents an amplitude of the sinusoidal BEMF voltage as a function of the measured rotation speed;
R represents the resistance;
L represents the inductance;
$\omega_{ecyc}$ represents a frequency of the sinusoidal BEMF voltage; and
|I| represents an amplitude of the periodic current.

14. The method as recited in claim 11, further comprising:
measuring a rotation speed of the spindle motor; and
adjusting the phase of the periodic driving voltage based on the measured rotation speed.

15. The method as recited in claim 14, further comprising adjusting the phase of the periodic driving voltage based on:

$$\tan^{-1}\left(\frac{|Vb(RPM)| - R|I|}{L_{\omega ecyc}|I|}\right)$$

where:
RPM represents the measured rotation speed;
|Vb(RPM)| represents an amplitude of the sinusoidal BEMF voltage as a function of the measured rotation speed;
R represents the resistance;
L represents the inductance;
$\omega_{ecyc}$ represents a frequency of the sinusoidal BEMF voltage; and
|I| represents an amplitude of the periodic current.

16. The method as recited in claim 11, further comprising:
comparing the supply voltage to a target voltage to generate an error signal; and
adjusting the phase of the periodic driving voltage and the amplitude of the periodic driving voltage based on the error signal.

17. The method as recited in claim 16, wherein adjusting the phase of the periodic driving voltage and the amplitude of the periodic driving voltage based on the error signal adjusts an amplitude of the current flowing through each winding.

18. The method as recited in claim 16, wherein the target voltage substantially maximizes an efficiency of a voltage regulator powered by the supply voltage.

19. A method of operating a data storage device, the method comprising:
  rotating a disk using a spindle motor comprising a plurality of windings;
  actuating a head over the disk;
  commutating the windings of the spindle motor based on a commutation sequence while applying a periodic driving voltage to each winding, wherein the periodic driving voltage comprises an operating amplitude during normal operation; and
  when a supply voltage for powering the data storage device falls below a threshold, configuring the spindle motor into a power generator by at least:
    comparing the supply voltage to a target voltage to generate an error signal; and
    adjusting the amplitude and a phase of the periodic driving voltage based on the error signal.

20. The method as recited in claim 19, further comprising adjusting the amplitude and phase of the periodic driving voltage so that a periodic current flowing through each winding is substantially opposite in phase from a sinusoidal back electromotive force (BEMF) voltage generated by each winding.

21. Control circuitry powered by a supply voltage, the control circuitry configured to:
  commutate windings of a spindle motor based on a commutation sequence while applying a periodic driving voltage to each winding, wherein the periodic driving voltage comprises an operating amplitude during normal operation; and
  when the supply voltage falls below a threshold, configure the spindle motor into a power generator by at least adjusting the amplitude and a phase of the periodic driving voltage so that a periodic current flowing through each winding is substantially opposite in phase from a sinusoidal back electromotive force (BEMF) voltage generated by each winding,
  wherein adjusting the amplitude and the phase of the periodic driving voltage comprises adjusting at least one of the amplitude and the phase based on an amplitude of the sinusoidal BEMF voltage, a resistance of the windings, and an inductance of the windings.

22. The control circuitry as recited in claim 21, further configured to:
  measure a rotation speed of the spindle motor; and
  adjust the amplitude of the periodic driving voltage based on the measured rotation speed.

23. The control circuitry as recited in claim 22, further configured to adjust the amplitude of the periodic driving voltage based on:

$$\sqrt{(|Vb(RPM)|-R|I|)^2+(L\omega_{ecyc}|I|)^2}$$

where:
  RPM represents the measured rotation speed;
  $|Vb(RPM)|$ represents an amplitude of the sinusoidal BEMF voltage as a function of the measured rotation speed;
  R represents the resistance;
  L represents the inductance;
  $\omega_{ecyc}$ represents a frequency of the sinusoidal BEMF voltage; and
  $|I|$ represents an amplitude of the periodic current.

24. The control circuitry as recited in claim 21, further configured to:
  measure a rotation speed of the spindle motor; and
  adjust the phase of the periodic driving voltage based on the measured rotation speed.

25. The control circuitry as recited in claim 24, further configured to adjust the phase of the periodic driving voltage based on:

$$\tan^{-1}\left(\frac{|Vb(RPM)| - R|I|}{L_{\omega ecyc}|I|}\right)$$

where:
  RPM represents the measured rotation speed;
  $|Vb(RPM)|$ represents an amplitude of the sinusoidal BEMF voltage as a function of the measured rotation speed;
  R represents the resistance;
  L represents the inductance;
  $\omega_{ecyc}$ represents a frequency of the sinusoidal BEMF voltage; and
  $|I|$ represents an amplitude of the periodic current.

26. Control circuitry powered by a supply voltage, the control circuitry configured to:
  commutate windings of a spindle motor based on a commutation sequence while applying a periodic driving voltage to each winding, wherein the periodic driving voltage comprises an operating amplitude during normal operation; and
  when the supply voltage falls below a threshold, configure the spindle motor into a power generator by at least:
    comparing the supply voltage to a target voltage to generate an error signal; and
    adjusting the amplitude and a phase of the periodic driving voltage based on the error signal.

27. The control circuitry as recited in claim 26, further configured to adjust the amplitude and phase of the periodic driving voltage so that a periodic current flowing through each winding is substantially opposite in phase from a sinusoidal back electromotive force (BEMF) voltage generated by each winding.

* * * * *